INVENTORS
JEAN CLAUDE BOUDRY
MARCEL CHAMBON
PIERRE FAUGERAS
COLETTE LHEUREUX
XAVIER L.R. TALMONT

BY William D. Stokes
ATTORNEY

INVENTORS
JEAN CLAUDE BOUDRY
MARCEL CHAMBON
PIERRE FAUGERAS
COLETTE LHEUREUX
XAVIER L.R. TALMONT

BY *William D. Stokes*

ATTORNEY

United States Patent Office 3,533,757
Patented Oct. 13, 1970

3,533,757
PROCESSES FOR SIMULTANEOUSLY PURIFYING AND CONCENTRATING PLUTONIUM SOLUTIONS
Jean Claude Boudry, Massy, Marcel Chambon, Cherbourg, Pierre Faugeras, Paris, Colette Lheureux, Neuilly-sur-Seine, and Xavier L. R. Talmont, Antony, France, assignors to Commissariat a l'Energie Atomique, Paris, France
Original application May 11, 1965, Ser. No. 454,785, now Patent No. 3,387,945, dated June 11, 1968. Divided and this application Jan. 25, 1968, Ser. No. 718,964
Claims priority, application France, June 9, 1964, 978,831
Int. Cl. C01g 56/00
U.S. Cl. 23—341                           2 Claims

ABSTRACT OF THE DISCLOSURE

The invention relates to a method of purifying a mother liquor of plutonium which comprises extracting a mixture of the mother liquor of plutonium and an aqueous extract containing plutonium in a countercurrent extraction process with an organic phase containing tributylphosphate. The organic phase containing the plutonium is then extracted in a countercurrent extraction process with a solution of nitric acid and then with a diluted sulfo-nitric acid solution, and a portion of the aqueous extract containing the plutonium is then recycled.

---

This application is a division of Ser. No. 454,785, filed May 11, 1965, now U.S. Pat. No. 3,387,945.

The present invention relates to improvements in the processes for simultaneously purifying and concentrating mother liquors of plutonium resulting, for instance, from the action of nitric acid on irradiated nuclear fuels in view of the production of plutonium said mother liquors having generally a low concentration in plutonium and containing large amounts of fission products even if they have been subjected to some first separation treatments.

It is known that the mother liquors of plutonium not only have to be purified but also must be concentrated generally up to at least 10 g. of plutonium per liter of solution, for the subsequent uses of this element.

The most generally used methods for obtaining concentrated solutions of plutonium consist either in concentrating the mother liquor by evaporation or in precipitating the plutonium from said mother liquor and subjecting the obtained precipitates to an acid redissolution.

However, these methods, regardless of the fact that they do not enable the purification of the plutonium, are burdened with numerous inconveniences. As a matter of fact, when evaporating the solutions, the plutonium compounds contained therein, in many instances, will polymerise and produce precipitates of plutonium hydroxide. In addition, the control of the valence state of the plutonium ions is extremely difficult and the plutonium ions tend to be oxidated at the 6 valence state and a reductor agent is then required, following the evaporation, to bring the plutonium back to the more convenient 4 valence state; further it is difficult to build an evaporator working with large flows since the quantities of plutonium present in the evaporator have to remain lower than the critical mass.

Finally if the precipitation method is preferred the difficulties lie principally in the complexity of the technology of the apparatuses enabling its performance.

A certain number of extraction methods of the plutonium from its mother liquors are also known. However it had not been possible yet to obtain plutonium raffinates with the sufficient degrees of purification and concentration with a reduced number of extraction operations.

The object of the invention is to remove all these inconveniences and to provide a continuous extraction process for the simultaneous purification and concentration of the plutonium from its mother liquors in a single operation.

According to the invention the mother liquors of plutonium are subjected, in a first step, to an extraction of the plutonium from the mother liquors by a solvent organic phase flowing in counter-current with respect to said mother liquor and, in a second step, the plutonium extracted by said organic phase is reextracted from said organic phase by an aqueous phase flowing in counter-current with respect to said organic phase, a portion of the reextraction aqueous phase containing purified plutonium in a high concentration being back-cycled to the above first step extraction and incorporated to the mother liquor subjected to the first step extraction by said organic phase.

In addition, and preferably, the organic phase charged in plutonium obtained in the first step extraction is subjected to a scrubbing by an aqueous acid solution flowing in counter-current with respect to said organic phase prior to the extraction of the plutonium from said phase in the following second step.

Such process enables the simultaneous concentration and purification of plutonium solutions in a single cycle of operations. The concentration of the plutonium in the raffinates thus obtained is easily controlled by the regulation of the flows of the solutions circulating in counter-current.

The back-cycling of the portion of the purified and concentrated plutonium solutions to the first step extraction permits, among others, the increase of the relative concentration in plutonium with respect to the other fission products in the mother liquor subjected to the extraction by the organic phase, as well as a more complete saturation of the latter in plutonium, whereby the extraction selectivity of the organic phase with respect to the plutonium is increased.

The process according to the invention is applicable in its most general form to any mother liquor of plutonium irrespective of the origin thereof, of their content in different ions, in particular in sulfate ions in the case where for instance the mother liquors have been treated previously with solutions of ferrous sulfamates or of uranous sulfates for carrying out first separations of radioactive products.

Concerning the extraction phase it is advantageously constituted of tributylphosphate diluted in an organic solvent constituted preferably by hydrocarbons having straight chains and withstanding radiolysis such as dodecane, by carbon-tetrachloride or also by fractions of distillation of oil, the boiling points of which range between 170 and 240° C., such fractions containing a large number of aromatic hydrocarbons.

Concerning the aqueous phase for the reextraction of the plutonium from the organic phase in the second above mentioned step it is generally constituted by a sulfonitric solution.

In the case where the mother liquors of plutonium contain large amounts of sulfates (those amounts even increasing in the extraction first step owing to the back-cycling of sulfonitric reextraction solutions of concentrated plutonium) it will be necessary to compensate the decrease of the distribution coefficient of the plutonium between the aqueous phase and the organic phase caused by the presence of said sulfate by adding salting out agents to said mother liquor. To that effect the concentration in nitric acid of the mother liquor must be increased and if the case should be salting out nitrates such as aluminum nitrate, must be added thereto too.

However in the case where the mother liquors of plutonium are constituted by aqueous phases completely or almost free of sulfate ions the sulfonitric solution is preferably replaced, according to a preferred alternative of the invention, by a solution of nitric acid containing hydrazine, the plutonium contained in the organic phase having however been previously reduced by uranous nitrate to its 3 valence state.

In connection with the back-cycling to the extraction first step of a portion of the concentrated raffinate of plutonium, provision must be made however for previously reoxidizing the plutonium of at least said portion, preferably by nitrous vapors, to bring the plutonium content back to its 4 valence state.

As a matter of fact the plutonium in the mother liquor must be in an oxidized form, preferably in its 4 valence state, to be extracted by the organic phase, the plutonium reduced in the 3 valence state not being extractable by the organic phase whereas the reextraction of the plutonium from the organic phase by a solution of nitric acid and hydrazine requires the plutonium to be reduced in its 3 valence state.

Thus when the reoxydisation of the plutonium contained in the portion back-cycled to the first extraction step has been effected it can be back-cycled in the extraction first step provided however that the possible excess of nitrous products be removed from this portion since such nitrous products are extractible by the organic phase and would then also disturb the reducing action of the uranous nitrate and require the use of large excesses of this reagent. The removal of said nitrous excesses from the aqueous reextraction portion can be easily effected by agitating the latter with air.

In such a manner the inconveniences generated by the sulfates as well as the voluntary introduction of foreign ions in the mother liquors (salting out agents) and the supplementary technological difficulties caused by the use of the very corrosive sulfonitric solutions are substantially overcome.

The use of this alternative of the invention is however practically limited to mother liquors containing sulfates in concentrations lower than about 0.2 M since the presence of even low amounts of sulfates require the increase of the concentration in nitric acid of the mother liquor (when said sulfate concentration equals 0.2 M the concentration of the mother liquor in nitric acid should be equal to 5 M) for obtaining sufficiently purified raffinates of concentrated plutonium with the process according to the invention. The organic extraction phases in the first step through their contact with such acid mother liquors will become themselves highly acid and the acidity will then disturb the reducing action of the uranous nitrate in the following second reextraction step.

Preferred embodiments of the present invention will be hereinafter described with reference to the accompanying drawings, given merely by way of example and in which.

Figure 1:
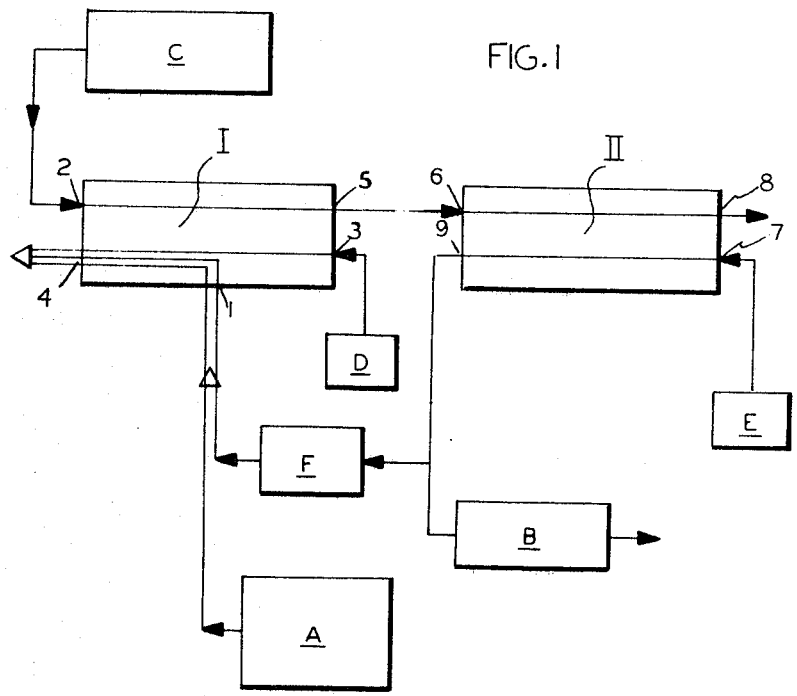
FIGS. 1 and 2 show diagrammatically an installation comprising two batteries of mixing and settling tanks for carrying out the process according to the invention.

Referring to FIG. 1 there is shown a first battery of mixing-settling tanks I for the first step extraction, said battery comprising for instance 12 stages and a second battery of mixing-settling tanks II for the second step reextraction comprising also for instance 12 stages; according to a preferred embodiment of the invention the mother liquor of plutonium shown in A is introduced at 1 in the middle of the battery in the mixing-settling tank I, for instance in the 6th stage thereof, together with a portion of the concentrated and purified plutonium raffinate which has been reextracted from the battery II. The remaining portion of said concentrated and purified solution not back-cycled to battery I is recovered in B.

The mixture of these aqueous solutions introduced in the 6th stage of the battery I meets therein a counter-current flow of an organic phase constituted by a solution of tributylphosphate coming from a source C and which has been introduced at 2 in the first stage or head of the battery I. Thus the first extraction step for the whole plutonium contained in said mixture of said aqueous solution is carried out between the middle and the head of the extraction battery I.

The organic phase charged with the plutonium is then subjected between the 6th and the 12th stage to a scrubbing by an acid solution, preferably constituted by nitric acid, coming from a source D and introduced at 3 in the 12th stage of the battery I.

The acid scrubbed solution and the above aqueous mixture which has been freed from its plutonium content leave the battery of mixing-settling tank I by the first stage thereof at 4.

The organic phase containing the plutonium leaves the extraction battery at 5 after having been scrubbed and enters the first stage of the reextraction battery II at 6 in which it meets a counter-current flow of a reextraction sulfonitric solution between the first and the last stage of said battery II, said sulfonitric solution coming from a source E and being introduced at 7 in the 12th stage of the reextraction battery II.

This sulfonitric solution then reextracts selectively the plutonium content from the organic phase and finally leaves the reextraction battery II at 9 by the first stage thereof. The organic phase which has thus been freed of its plutonium content leaves the reextraction battery II through the 12th stage thereof at 8.

Part of the purified and concentrated sulfonitric reextraction phase or raffinate is recovered in B for its further treatment, the other part or portion shown at F being back-cycled together with the mother liquor of plutonium arriving from A to the first extraction step.

Figure 2:
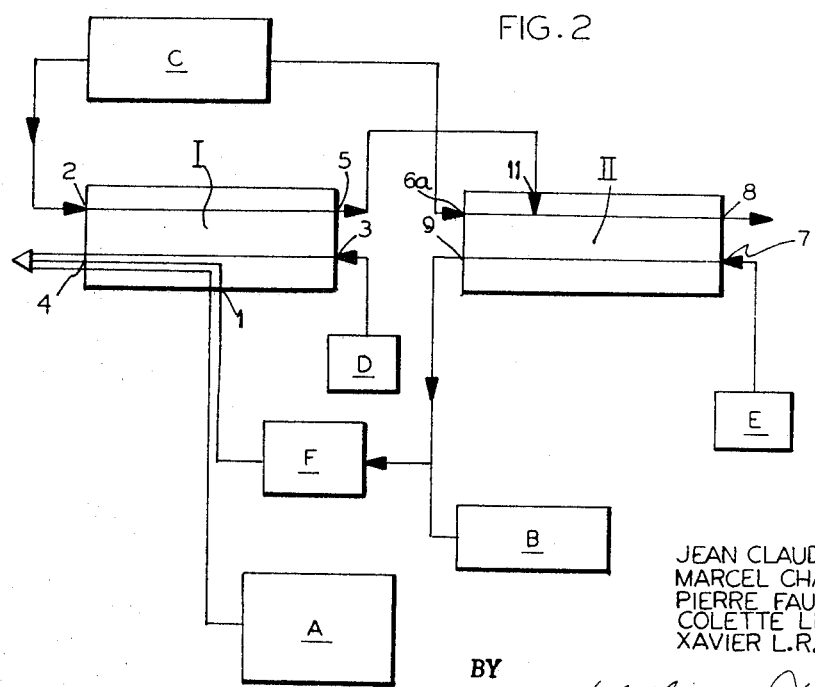

The installation shown in FIG. 2 differs essentially from the same shown in FIG. 1 in that a scrubbing zone for the reextraction aqueous phase of purified and concentrated plutonium is foreseen in the head part of the reextraction battery II by an organic solvent.

The other elements of the installation of FIG. 2 analogous to those of FIG. 1 are referred to by the same numerals.

The organic phase containing all the plutonium extracted from the mother liquor which leaves the extraction battery I at 5, instead of being reintroduced in the first stage of the reextraction battery II, is introduced a few stages below for instance in the 4th stage thereof at 11, the reextraction of the plutonium from said organic phase then occurring between the 4th and the 12th stage. The counter-current flowing sulfonitric solution, introduced at 7, is then scrubbed with a counter-current flowing clean organic phase between the 4th and the first stage of reextraction battery II to remove the uranium traces which may have been reextracted together with the plutonium from the organic extraction phase, said clean organic phase being introduced in the first stage of the reextraction battery II at 6a and leaving it at 8 together with the extraction organic phase.

An example showing the purification of the mother liquor of plutonium in the installation diagrammatically shown in FIG. 2 is disclosed herebelow.

EXAMPLE I

Each of the batteries I and II comprises 12 stages. 5 liters per hour of a mother liquor having the composition indicated below are introduced in the 6th stage of the extraction battery I:

Content in Pu: 0.2 gram per liter (g./l.)
Content in fission products: 10 millicuries per liter (mci./l.)
Content in uranium: 0.5 g./l.
Content in Fe: 1 g./l.
Content in $SO_4^=$: 0.15 M (molarity)
Free $NO_3H$: 1 M Owing to the high content of the solution in sulfate ions, 5 liters per hour of a solution of hydrated aluminum nitrate 2 M and of nitric acid 2 M are introduced together with the mother liquor in the extraction battery I for favoring the salting out of the plutonium from the mother liquor into the organic phase.

4 liters per hour of an organic phase constituted by a solution of 30% of tributyl phosphate in dodecane are introduced at 2 in the first stage of the extraction battery I, said organic phase extracting the plutonium from the aqueous phase between the first and the 6th stage and being washed between the 6th and the 12th stage by a molar solution of nitric acid introduced at 3 at a rate of 1.5 l./h. The organic phase leaving the reextraction battery I is introduced at 11 in the 4th stage of the reextraction battery II wherein it meets a counter-current flow of a mixture of 0.1 M nitric acid and of 0.05 M sulfuric acid introduced at 7 in the 12th stage of the reextraction battery II at a rate of 1.6 l./h. The aqueous reextraction phase of plutonium is washed between the 4th and the first stage of battery II by an organic phase also constituted by a solution of 30% tributylphosphate in dodecane introduced at 6a in the first stage.

1.5 l./h. of this reextraction phase or raffinate are back-cycled to the first step extraction together with the mother liquor of plutonium and 0.1 l./h. of concentrated and purified plutonium is recovered in B.

The extraction yield of plutonium is of 99.99%. The plutonium concentration of the raffinate equals 10 g./l. of solution.

The raffinate recovered in B still contains 0.05 mci./l. of fission products (such a concentration corresponding to a decontamination factor of 1000 with respect to the plutonium) and 0.025 g./l. of uranium (corresponding to a decontamination factor of 1000 with respect to the plutonium), being understood that the decontamination factor is defined by the ratio of the quantities either of the fission products or of the uranium which coexist with 1 g. of plutonium respectively before and after the purification treatment of its solutions.

It must be noted that the scrubbing of the organic phase in the first step extraction by a clean acid solution in the extraction battery I is of a great importance since it contributes very efficiently to the decontamination of the plutonium and in particular provides for the complete separation of ruthenium.

Figure 3:
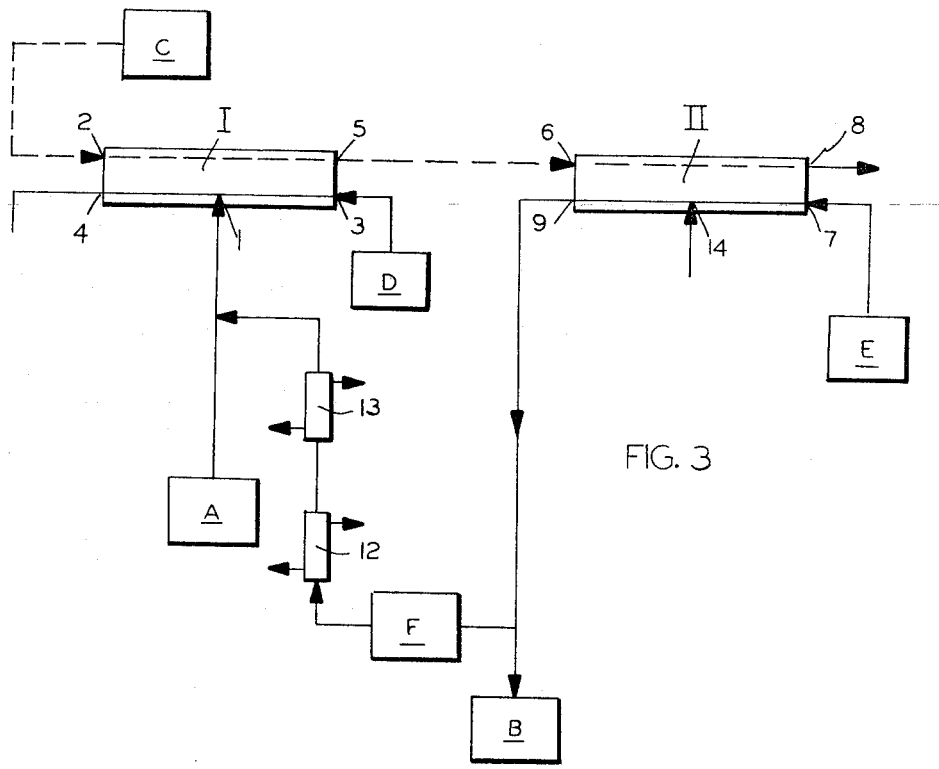
FIGS. 3 and 4 show an installation for carrying out, more particularly, the above described alternative of the invention in which the aqueous reextraction phase is constituted by a solution of nitric acid and of hydrazine nitrate.
Figure 4:
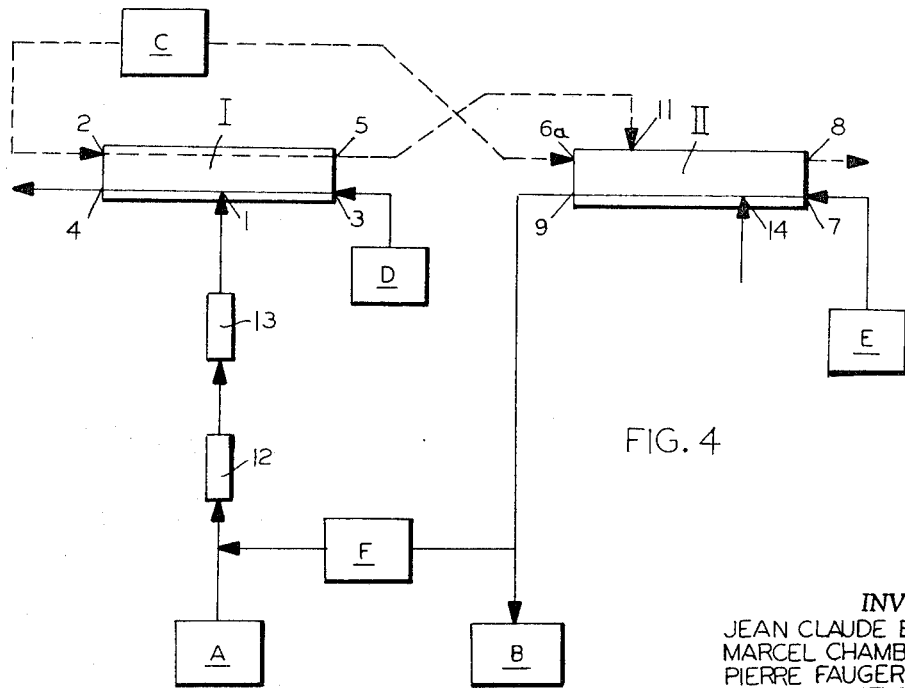

The above described alternative of the process according to the invention, wherein the reextraction aqueous solution in the second step of said process is constituted by a solution of nitric acid and of hydrazine (preferably in the form of hydrazine nitrate) is advantageously carried out in the installations, shown diagrammatically in FIGS. 3 and 4, in which the elements similar to those already described in FIGS. 1 and 2 are referred to by the same numerals. Those FIGS. 3 and 4 differ essentially from FIGS. 1 and 2 in that one provides after the exit of the aqueous reextraction solution of the plutonium from the reextraction battery II two vessels 12 and 13 in which at least the portions of the concentrated raffinate of plutonium to be back-cycled to the extraction battery I are subjected to a reoxidizing treatment to bring back the plutonium at its 4 valence state. Nitrous vapors are allowed to bubble through the raffinate in the vessel 12, said raffinate being then agitated with air in vessel 13 to remove the excess of nitrous products which said raffinate may contain prior to its introduction together with the mother liquor arriving from A at 1 into the extraction battery I.

Concerning also more specifically the reextraction step performed in the reextraction battery II the solution of nitric acid and hydrazine enters at 7 in the 12th stage of the battery II. As concerns the solution of uranous nitrate it must be introduced at a point of the battery II where it ensures in the best conditions the reduction of the totality of the plutonium contained in the organic phase entering the reextraction battery II at 6.

As a matter of fact the uranous nitrate is readily absorbed in the organic phase but also tends to be oxidized very easily. Thus an excess of uranous nitrate must be used. It has been observed that the uranous nitrate shows its best reductor action with respect to the plutonium in the area close to its point of introduction in the reextraction battery II, and it has been found that the best point of introduction of the uranous nitrate in the battery is substantially the middle thereof.

Finally there is obtained at the exit 9 of the reextraction battery II a raffinate containing all the plutonium under its 3 valence state, but also some traces of uranium under its 6 valence state.

As a matter of fact the uranium introduced at 14 under its 4 valence state is completely extracted by the organic phase, but the uranium oxidized at the 6 valence state, in particular during the reduction reaction of the plutonium under its 3 valence state, shows a less favorable distribution coefficient between the two phases so that small amounts of the oxidized uranium contaminate the otherwise highly purified and concentrated raffinate of plutonium.

Thus it is advantageous to provide for a final counter-current scrubbing of the reextraction aqueous phase by a clean selective solvent to remove these residual uranium traces. To that effect in the same manner as in FIG. 2 it can be foreseen, as shown in FIG. 4, to introduce the organic phase charged with plutonium, leaving the extraction battery I, in the reextraction battery II, at 11 a few stages below the head of the battery II, a charge of clean organic phase being introduced at 6a in the first stage of battery II for flowing in a counter-current with respect to the aqueous reextraction solutions leaving the reextraction battery II at 9.

The hydrazing which is contained preferably in both the reductor solution of uranous nitrate and in the reextracting aqueous solution and the concentration of which needs not to be controlled in a very close fashion, is believed to stabilize both the uranium and the plutonium in their low valence states during the second step reextraction.

Two examples showing the carrying out of the process according to this alternative of the invention in connection respectively with FIG. 3 and FIG. 4 will be described herebelow.

EXAMPLE 2 (SEE FIG. 3)

5 l./h. of a solution coming from the treatment of an irradiated nuclear fuel which has been reacted with nitric acid and which has been previously treated for a first separation of uranium is introduced at 1 in the 8th stage of an extraction battery I comprising 16 stages. The composition of the solution is as follows:

Content in Pu: 0.5 g./l.
Content in fission products: 10 mci./l.
Content in uranium: 0.275 g./l.
Free $NO_3H$: 3.5 M This solution has been previously oxidized with nitrous vapors. 0.275 l./h. of a concentrated solution of plutonium containing 20 g./l. of this element and arriving from the reextraction battery II are introduced with the above said mother liquor in the extraction battery I. 2 l./h. of a solution of 30% tributylphosphate in dodecane are introduced in the head of the extraction battery I and 1 l./h. of a solution of molar nitric acid for the washing of the organic phase charged with plutonium is introduced at 3 in the 16th stage of battery I. The organic phase leaving the extraction battery I enters the first stage of the reextraction battery II a 6 where it meets the counter-current flow of an aqueous phase constituted, on the one hand, by a solution containing 100 g./l. of uranous nitrate and 9.5 g./l. of hydrazine which has been introduced at 14 in the 8th stage of the reextraction battery II at a rate of 0.16 l./h. and, on the other hand, a solution molar in nitric acid and 0.1 molar in hydrazine nitrate which has been introduced at 7 in the 16th stage of the reextraction battery II, at a rate of 0.24 l./h.

The plutonium contained in the organic phase is thereby reextracted in the aqueous phase which leaves the reextraction battery II at 9 at a rate of 0.4 l./h. 0.125 l./h. of this solution is collected in B whereas 0.275 l./h. is back-cycled to the first step extraction at the 8th stage of the extraction battery I after having been subjected to the previous oxidizing treatment in the vessels 12 and 13. The concentrated raffinate obtained in B has the following composition:

Content in Pu: 20 g./l.
Content in U: 0.1 g./l.
 (decontamination factor of 110 with respect to Pu)
Fission products: 0.1 mci.
 (decontamination factor of 2000 with respect to Pu)

EXAMPLE 3 (SEE FIG. 4)

5 l./h. of a mother liquor under its 4 valence state and having the following composition:

Pu: 0.5 g./l.
U: 0.5 g./l.
$NO_3H$: 3.5 M
Fission products: 10 mci./l.

are introduced at 1 in the 6th stage of the extraction battery I together with 0.275 l./h. of a concentrated raffinate of plutonium containing 20 g./l. of this element and arriving from the reextraction battery II.

2 l./h. of a solution of 30% tributylphosphate in dodecane are introduced in the first stage of the extraction battery I at 2 and 1 l./h. of a molar solution of nitric acid for washing the organic phase charged with plutonium is introduced at 3 in the 12th stage of the extraction battery I.

The organic phase leaving the extraction battery I is introduced at 11 in the 3rd stage of the reextraction battery II wherein it meets a counter-current flow of an aqueous phase constituted, on the one hand, of a solution containing 100 g./l. of uranous nitrate and 9.5 g./l. of hydrazine nitrate introduced at 14 in the reextraction battery II at a rate of 0.16 l./h. and, on the other hand, of a solution molar in nitric acid and 0.1 molar in hydrazine nitrate introduced at 7 in the 12th stage of the battery II at a rate of 0.24 l./h.

This aqueous phase reextracts the plutonium contained in the organic phase and is subjected to a scrubbing between the third and the first stage of battery II, by a solution of 30% tributylphosphate in dodecane entering at 6a in the first stage of the reextraction battery II. 0.4 l./h. of a concentrated and purified raffinate of plutonium leaves the reextraction battery II, part of said raffinate being back-cycled to the first extraction step.

This solution has the following composition:

|      | G./l. |
|------|-------|
| Pu   | 20    |
| U    | 0.002 |

(corresponding to a decontamination factor of 10,000 with respect to Pu)

|                  | Mci./l. |
|------------------|---------|
| Fission products | 0.1     |

(corresponding to a decontamination factor of 2000 with respect to Pu).

It will be appreciated that, though the Example 2 shows already good results in obtaining concentrated and purified raffinates of plutonium, that the supplementary scrubbing of the reextraction aqueous phase, before it leaves the reextraction battery II, by a counter-current flow of a clean solvent contributes in a very important manner to the purifying and concentrating of the solutions of plutonium, as it can be noted from the decontamination factors with respect to the Pu which pass respectively from 200 to 2000 for the fission products and from 110 to 10,000 for the uranium.

What is claimed is:
1. A continuous process for simultaneously purifying and concentrating a mother liquor of plutonium which comprises, in a first step, subjecting said motor liquor together with an aqueous extract containing plutonium to a counter-current extraction with a flow of an organic phase containing tributylphosphate, washing the organic phase containing the plutonium with a counter-current flow of a nitric acid solution, reextracting said plutonium from said organic phase with a counter-current flow of a diluted sulfo-nitric solution, and back-cycling a portion of the sulfo-nitric solution containing the reextracted plutonium which forms said aqueous extract containing plutonium in the first extraction step together with the mother liquor of plutonium.

2. A continuous process for simultaneously purifying and concentrating a mother liquor of plutonium which comprises subjecting, in a first step, said mother liquor together with recycled aqueous solution containing plutonium to a counter-current extraction with a flow of organic phase consisting of a solution of about 30% of tributyl phosphate in dodecane, washing the organic phase with a counter-current flow of an approximately molar solution of nitric acid reextracting the plutonium from the organic phase with a counter-current flow of a diluted sulfo-nitric solution having a concentration of about 0.1 M in nitric acid and a concentration of about 0.05 M in sulfuric acid, and recycling a portion of the sulfo-nitric solution containing the reextracted plutonium to the extraction first step together with the mother liquor of plutonium.

References Cited

UNITED STATES PATENTS 2,882,124   4/1959   Seaborg _____ 24—341

OTHER REFERENCES

Cooper, Walling, Aqueous Processes for Separation and Decontamination of Irradiated Fuels, 2nd U.N. Int. Conf. on Peaceful Uses of Atomic Energy, 1958, vol. 17, pp. 296–7.

LELAND A. SEBASTIAN, Primary Examiner

U.S. Cl. X.R.

23—340